Nov. 3, 1931.   J. J. QUINN   1,830,132
DRAIN VALVE
Filed Sept. 23, 1929
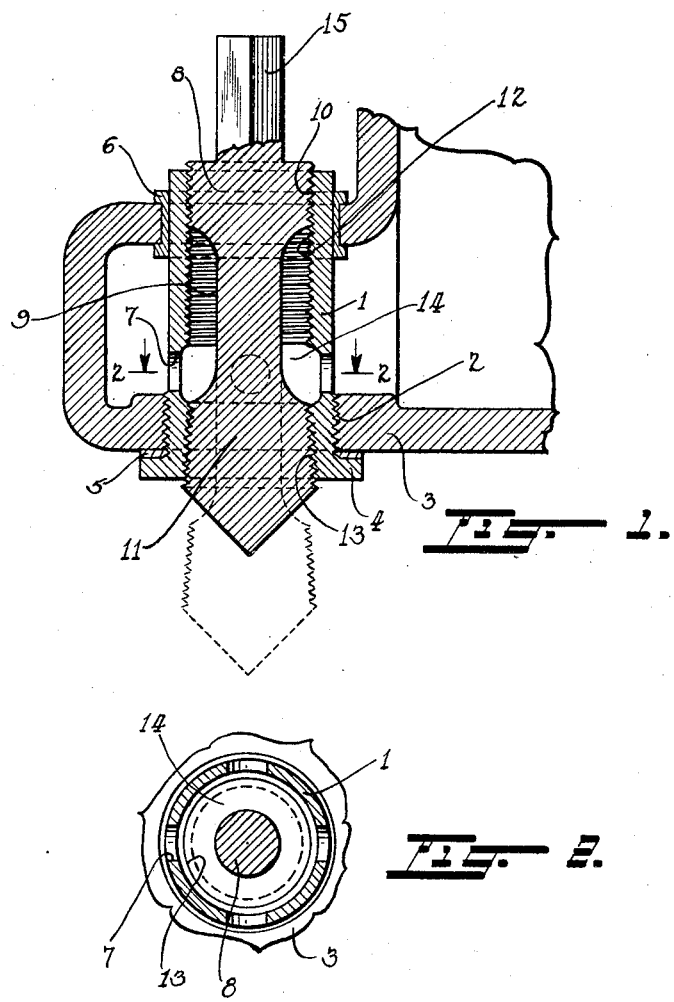
INVENTOR
J. J. Quinn
BY
ATTORNEYS Patented Nov. 3, 1931

1,830,132

UNITED STATES PATENT OFFICE

JOHN J. QUINN, OF CHICAGO, ILLINOIS

DRAIN VALVE

Application filed September 23, 1929. Serial No. 394,565.

My invention relates to improvements in drain valves, and it consists in the combinations, constructions, and arrangements herein described and claimed.

An object of my invention is to provide a drain valve whereby oil may be drained from the crankcase of an automobile motor without compelling the operator to get under the automobile.

A further object of my invention is to provide a novel form of automobile crankcase valve which may be more easily actuated than the means usually employed.

A further object is to provide a valve of the type described which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a vertical sectional view of my device as applied to the crankcase of an automobile, and Figure 2 is a section along the line 2—2 of Figure 1.

In carrying out my invention, I provide a casing or hollow body portion 1 having one end threaded externally at 2 so that the casing may be screwed into the crankcase 3 of an engine. The end of the casing has an enlarged portion 4 for holding a packing washer 5 in order to provide a liquid-tight connection. The opposite end of the casing is provided with a packing member 6 to also provide a liquid-tight connection.

The hollow casing has a plurality of openings 7 radially disposed therein and arranged to provide communication between the crankcase and the interior of the casing. A valve 8 is provided with a relatively small central portion 9 and relatively large end portions 10 and 11. The end portion 10 is threaded and is receivable in a threaded opening 12 of the casing 1.

The enlarged end portion 11 is tapered inwardly and provided with threads which are receivable in threads formed in a tapered outlet opening 13 of the casing 1.

The relatively small portion of the valve provides a compartment 14 adjacent the opening 7 for a purpose hereinafter described. Any suitable means, such as a square shank 15 adapted to receive a wrench, may be provided for actuating the valve 8.

From the foregoing description of the various parts of the device, the operation thereof may be readily understood. In Figure 1 the valve is shown in solid lines for the closed position and in dotted lines for the open position. When the valve is closed and the crankcase is provided with oil, the oil will pass through the openings 7 and into the compartment 14. The oil is retained in the crankcase until the valve is lowered into open position by rotation.

When the valve 8 is in the open position, the enlarged portion 11 is positioned beneath the casing 1 as shown in dotted lines in Figure 1, thus allowing the oil in the crankcase to flow through the outlet opening 13. While in this position, the reduced portion 9 will allow communication between the inlet openings 7 and the outlet opening 13. Furthermore, the enlarged portion 10 guides the valve in its movement and moves the threads of the portion 11 in mesh with the threads of the outlet opening 13. The valve 8 may be moved into its closed position due to rotation and the crankcase may again be supplied with any desired lubricant such as oil.

I claim:

1. A device of the type described comprising a casing having a plurality of inlet openings and an outlet opening disposed therein, said outlet opening having a tapered wall provided with threads, a valve disposed in said casing, said valve having a reduced portion, an enlarged sealing portion having a tapered wall provided with threads arranged to engage with the threads of the tapered wall of said outlet opening, an enlarged guide portion provided with threads arranged to engage with threads provided in said casing, and means whereby said valve may be actuated, whereby said valve may be moved downwardly for moving said sealing portion out of said outlet opening.

2. A device of the type described comprising a casing having a plurality of inlet openings and an outlet opening disposed therein, said outlet opening having a tapered wall provided with threads, a valve disposed in said casing, said valve having a reduced portion, an enlarged sealing portion having a tapered wall provided with threads arranged to engage with the threads of the tapered wall of said outlet opening, an enlarged guide portion provided with threads arranged to engage with threads provided in said casing, and means whereby said valve may be actuated, whereby said valve may be moved downwardly for moving said sealing portion out of said outlet opening, said threaded portions being arranged whereby the threads of said sealing member may engage with the threads of said outlet opening as said valve is moved upwardly due to its threaded connection with said casing.

Signed at Chicago, in the county of Cook, and State of Illinois this 18th day of September, A. D. 1929.

JOHN J. QUINN.